(12) United States Patent
Wegerich et al.

(10) Patent No.: US 7,739,096 B2
(45) Date of Patent: Jun. 15, 2010

(54) SYSTEM FOR EXTRACTION OF REPRESENTATIVE DATA FOR TRAINING OF ADAPTIVE PROCESS MONITORING EQUIPMENT

(75) Inventors: Stephan W. Wegerich, Glendale Heights, IL (US); Alan D. Wilks, Mount Prospect, IL (US); Andre Wolosewicz, Woodridge, IL (US)

(73) Assignee: SmartSignal Corporation, Lisle, IL (US)

( * ) Notice: Subject to any disclaimer, the term of this patent is extended or adjusted under 35 U.S.C. 154(b) by 2663 days.

(21) Appl. No.: 09/784,158

(22) Filed: Feb. 16, 2001

(65) Prior Publication Data

US 2002/0087290 A1    Jul. 4, 2002

Related U.S. Application Data

(60) Provisional application No. 60/187,959, filed on Mar. 9, 2000.

(51) Int. Cl.
G06G 7/62    (2006.01)

(52) U.S. Cl. .......................................... 703/17; 702/183

(58) Field of Classification Search ..................... 703/2, 703/17; 706/26, 20, 21, 22, 23, 25, 12; 700/30, 700/31, 47, 33, 48, 49; 702/180, 179, 182, 702/183
See application file for complete search history.

(56) References Cited

U.S. PATENT DOCUMENTS

| | | | |
|---|---|---|---|
| 3,045,221 A | 7/1962 | Roop | |
| 4,060,716 A | 11/1977 | Pekrul et al. | |
| 4,336,595 A | 6/1982 | Adams et al. | |
| RE31,750 E | 11/1984 | Morrow | |
| 4,480,480 A | 11/1984 | Scott et al. | |
| 4,639,882 A | 1/1987 | Keats | |
| 4,707,796 A | 11/1987 | Calabro et al. | |
| 4,761,748 A | 8/1988 | Le Rat et al. | |
| 4,796,205 A | 1/1989 | Ishii et al. | |
| 4,823,290 A | 4/1989 | Fasack et al. | |
| 4,937,763 A | 6/1990 | Mott | |
| 4,985,857 A | 1/1991 | Bajpai et al. | |
| 5,003,950 A | 4/1991 | Kato et al. | |
| 5,025,499 A | 6/1991 | Inoue et al. | |
| 5,052,630 A | 10/1991 | Hinsey et al. | |
| 5,093,792 A | 3/1992 | Taki et al. | |
| 5,113,483 A | 5/1992 | Keeler et al. | |
| 5,119,287 A | 6/1992 | Nakamura et al. | |

(Continued)

OTHER PUBLICATIONS http://mathworld.wolfram.com/DistributionFunction.html.*

(Continued)

*Primary Examiner*—Paul L Rodriguez
*Assistant Examiner*—Russ Guill
(74) *Attorney, Agent, or Firm*—Fitch, Even, Tabin & Flannery

(57) ABSTRACT

System and method for selection of appropriate modeling data from a general data set to characterize a modeled process. The data is typically correlated sensor data, representing a multitude of snapshots of a sensed machine or process. The invention accommodates selection of greater amounts of general data for inclusion in the modeling data where that data exhibits greater dynamics, and selects less data from regions of little change. The system can comprise a computer running a software program, or a microprocessor.

37 Claims, 9 Drawing Sheets

U.S. PATENT DOCUMENTS

| | | | |
|---|---|---|---|
| 5,123,017 A | 6/1992 | Simpkins et al. | |
| 5,195,046 A | 3/1993 | Gerardi et al. | |
| 5,210,704 A | 5/1993 | Husseiny | |
| 5,223,207 A | 6/1993 | Gross et al. | |
| 5,251,285 A | 10/1993 | Inoue et al. | |
| 5,285,494 A | 2/1994 | Sprecher et al. | |
| 5,309,351 A | 5/1994 | McCain et al. | |
| 5,311,562 A | 5/1994 | Palusamy et al. | |
| 5,325,304 A | 6/1994 | Aoki | |
| 5,327,349 A | 7/1994 | Hoste | |
| 5,386,373 A | 1/1995 | Keeler et al. | |
| 5,414,632 A | 5/1995 | Mochizuki et al. | |
| 5,420,571 A | 5/1995 | Coleman et al. | |
| 5,421,204 A | 6/1995 | Svaty, Jr. | |
| 5,445,347 A | 8/1995 | Ng | |
| 5,446,671 A | 8/1995 | Weaver et al. | |
| 5,446,672 A | 8/1995 | Boldys | |
| 5,455,777 A | 10/1995 | Fujiyama et al. | |
| 5,459,675 A | 10/1995 | Gross et al. | |
| 5,481,647 A | 1/1996 | Brody et al. | |
| 5,486,997 A | 1/1996 | Reismiller et al. | |
| 5,500,940 A | 3/1996 | Skeie | |
| 5,502,543 A | 3/1996 | Aboujaoude | |
| 5,539,638 A | 7/1996 | Keeler et al. | |
| 5,548,528 A | 8/1996 | Keeler et al. | |
| 5,553,239 A | 9/1996 | Heath et al. | |
| 5,559,710 A | 9/1996 | Shahraray et al. | |
| 5,566,092 A | 10/1996 | Wang et al. | |
| 5,586,066 A | 12/1996 | White et al. | |
| 5,596,507 A | 1/1997 | Jones et al. | |
| 5,600,726 A | 2/1997 | Morgan et al. | |
| 5,602,733 A | 2/1997 | Rogers et al. | |
| 5,608,845 A | 3/1997 | Ohtsuka et al. | |
| 5,612,886 A | 3/1997 | Weng | |
| 5,617,342 A | 4/1997 | Elazouni | |
| 5,623,109 A | 4/1997 | Uchida et al. | |
| 5,629,878 A | 5/1997 | Kobrosly | |
| 5,638,413 A | 6/1997 | Uematsu et al. | |
| 5,657,245 A | 8/1997 | Hecht et al. | |
| 5,663,894 A | 9/1997 | Seth et al. | |
| 5,668,944 A | 9/1997 | Berry | |
| 5,671,635 A | 9/1997 | Nadeau et al. | |
| 5,680,409 A | 10/1997 | Qin et al. | |
| 5,680,541 A | 10/1997 | Kurosu et al. | |
| 5,682,317 A | 10/1997 | Keeler et al. | |
| 5,708,780 A | 1/1998 | Levergood et al. | |
| 5,710,723 A | 1/1998 | Hoth et al. | |
| 5,727,144 A | 3/1998 | Brady et al. | |
| 5,737,228 A | 4/1998 | Ishizuka et al. | |
| 5,748,469 A | 5/1998 | Pyötsiä | |
| 5,748,496 A | 5/1998 | Takahashi et al. | |
| 5,751,580 A | 5/1998 | Chi | |
| 5,754,451 A | 5/1998 | Williams | |
| 5,761,090 A | 6/1998 | Gross et al. | |
| 5,764,509 A * | 6/1998 | Gross et al. | 700/29 |
| 5,774,379 A | 6/1998 | Gross et al. | |
| 5,787,138 A | 7/1998 | Ocieczek et al. | |
| 5,802,509 A * | 9/1998 | Maeda et al. | 706/59 |
| 5,809,490 A * | 9/1998 | Guiver et al. | 706/16 |
| 5,817,958 A | 10/1998 | Uchida et al. | |
| 5,818,716 A | 10/1998 | Chin et al. | |
| 5,822,212 A | 10/1998 | Tanaka et al. | |
| 5,841,677 A | 11/1998 | Yang et al. | |
| 5,842,157 A | 11/1998 | Wehhofer et al. | |
| 5,864,773 A | 1/1999 | Barna et al. | |
| 5,895,177 A | 4/1999 | Iwai et al. | |
| 5,905,989 A | 5/1999 | Biggs | |
| 5,909,368 A | 6/1999 | Nixon et al. | |
| 5,913,911 A | 6/1999 | Beck et al. | |
| 5,930,156 A | 7/1999 | Kennedy | |
| 5,930,779 A | 7/1999 | Knoblock et al. | |
| 5,933,352 A | 8/1999 | Salut | |
| 5,933,818 A | 8/1999 | Kasravi et al. | |
| 5,940,298 A | 8/1999 | Pan et al. | |
| 5,946,661 A | 8/1999 | Rothschild et al. | |
| 5,946,662 A | 8/1999 | Ettl et al. | |
| 5,950,147 A | 9/1999 | Sarangapani et al. | |
| 5,956,487 A | 9/1999 | Venkatraman et al. | |
| 5,960,435 A * | 9/1999 | Rathmann et al. | 707/101 |
| 5,961,560 A | 10/1999 | Kemner | |
| 5,987,399 A | 11/1999 | Wegerich et al. | |
| 5,993,041 A | 11/1999 | Toba | |
| 6,006,192 A | 12/1999 | Cheng et al. | |
| 6,006,260 A | 12/1999 | Barrick, Jr. et al. | |
| 6,021,396 A | 2/2000 | Ramaswamy et al. | |
| 6,029,097 A | 2/2000 | Branicky et al. | |
| 6,049,741 A | 4/2000 | Kawamura | |
| 6,049,827 A | 4/2000 | Sugauchi et al. | |
| 6,088,626 A | 7/2000 | Lilly et al. | |
| 6,104,965 A | 8/2000 | Lim et al. | |
| 6,110,214 A | 8/2000 | Klimasauskas | |
| 6,115,653 A | 9/2000 | Bergström et al. | |
| 6,125,351 A | 9/2000 | Kauffman | |
| 6,128,540 A | 10/2000 | Van Der Vegt et al. | |
| 6,128,543 A | 10/2000 | Hitchner | |
| 6,141,647 A | 10/2000 | Meijer et al. | |
| 6,144,893 A | 11/2000 | Van Der Vegt et al. | |
| 6,272,449 B1 * | 8/2001 | Passera | 703/2 |
| 6,278,962 B1 * | 8/2001 | Klimasauskas et al. | 703/13 |
| 6,941,287 B1 * | 9/2005 | Vaidyanathan et al. | 706/12 |

OTHER PUBLICATIONS

Black, Christopher L.; Uhrig, Robert E.; Hines, J. Wesley; "System Modeling and Instrument Calibration Verification with a Nonlinear State Estimation Technique", Maintenance and Reliability Conference Proceedings, May 12-14, 1998.*

Freund, Rudolf J.; Wilson, William J.; "Statistical Methods", 1993, Academic Press.*

Rubinstein, Reuven Y.; "Simulation and the Monte Carlo Method", 1981, John Wiley & Sons.*

Wong, Man To; Geva, S.; Orlowski, M.; "Pattern recognition from neural network with functional dependency preprocessing", 1997, Proceedings of IEEE Speech and Technologies for Computing and Telecommunications.*

Kris Popat and Rosalind W. Picard, "Cluster-Based Probability Model and Its Application to Image and Texture Processing", Feb. 1997, IEEE Transactions on Image Processing, vol. 6, No. 2, pp. 268-284.*

Olivier Chapelle et al., "Support Vector Machines for Histogram-Based Image Classification", Sep. 1999, IEEE Transactions on Neural Networks, vol. 10, No. 5, pp. 1055-1064.*

David M.J. Tax and Robert P.W. Duin, "Support vector domain description", 1999, Pattern Recognition Letters, vol. 20, pp. 1191-1199.*

Rudolph J. Freund and William J. Wilson, Statistical Methods, 1993, Academic Press, pp. 8-15 and 574-575.*

James Doughtery et al., "Supervised and Unsupervised Discretization of Continuous Features", 1995, in "Machine Learning: Proceedings of the Twelfth International Conference" ed. Armand Prieditis and Stuart Russell, Morgan Kaufmann Publishers, nine unnumbered pages.*

F. Hussain et al., "Discretization: An Enabling Technique", Jun. 1999, The National University of Singapore, pp. 1-27.*

Aynur A. Dayanik et al., "Binning: Converting Numerical Classification into Text Classification", Jun. 2000, Seventeenth International Conference on Machine Learning, eight unnumbered pages.*

David B. Skalak, "Prototype and Feature Selection by Sampling and Random Mutation Hill Climbing Algorithms", 1994, International Conference on Machine Learning, nine unnumbered pages.*

D. Randall Wilson et al., "Reduction Techniques for Instance-Based Learning Algorithms", Mar. 2000, Machine Learning, vol. 38, No. 3, pp. 1-32.*

David B. Skalak, "Prototype Selection for Composite Nearest Neighbor Classifiers", May 1997, University of Massachusetts Amherst, pp. 1-259.*

D. Psaltis et al., "A multilayered neural network controller", 1988, IEEE Control Systems Magazine, vol. 8, issue 2, pp. 17-21.*

Kah-Kay Sung et al., "Example-Base Learning for View-Based Human Face Detection", 1998, IEEE Transactions on Pattern Analysis and Machine Intelligence, vol. 20, No. 1, pp. 39-51.*

"Application of a New Technique for Modeling System Behavior" by Paul J. O'Sullivan, presented at the ISA Symposium, Edmonton, Alberta, May 1, 1991, © Copyright 1991 Instrument Society of America (21 pp.).

"A Universal, Fault-Tolerant, Non-Linear Analytic Network for Modeling and Fault Detection," by J. E. Mott, R. W. King, L. R. Monson, D. L. Olson, and J. D. Staffon, Proceedings of the 8th Power Plant Dynamics, Control & Testing Symposium, Knoxville, Tennessee, May 27-29, 1992 (14 pp.).

ModelWare™ Product Review by Robert D. Flori, reprinted from Computerized Investing, Sep./Oct. 1992, vol. XI, No. 5, copyright by the American Association of Individual Investors (pp. 8-10).

ModelWare™ A New Approach to Prediction by Ken Tucker, reprinted from PC AI magazine, Jan./Feb. 1993, pp. 14, 15, 30.

"Similarity Based Regression: Applied Advanced Pattern Recognition for Power Plant Analysis," by E. J. Hansen and M. B. Caudill, presented at the 1994 EPRI Heat Rate Improvement Conference (9 pp.).

"Applied Pattern Recognition for Plant Monitoring and Data Validation," by Ron Griebenow, E. J. Hansen, A. L. Sudduth, presented at the Fifth International Joint ISA POWID/EPRI Controls and Instrumentation Conference, La Jolla, California, Jun. 19-21, 1995 (11 pp.).

"Model-Based Nuclear Power Plant Monitoring and Fault Detection: Theoretical Foundations," by Ralph M. Singer, Kenny C. Gross, James P. Herzog, Ronald W. King, and Stephan Wegerich, presented at the International Conference on Intelligent System Application to Power Systems (ISAP '97), Jul. 6-10, 1997, Seoul, Korea (pp. 60-65).

"Application of a Model-Based Fault Detection System to Nuclear Plant Signals," by K. C. Gross, R. M. Singer, S. W. Wegerich, J. P. Herzog, R. VanAlstine, and F. Bockhorst, presented at the International Conference on Intelligent System Application to Power Systems (ISAP '97), Jul. 6-10, 1997, Seoul, Korea (pp. 66-70).

"Dynamics Sensor Validation for Reusable Launch Vehicle Propulsion," by J. P. Herzog, Y. Yue, and R. L. Bickford, presented at the 34th AIAA/ASME/SAE/ASEE Joint Propulsion Conference & Exhibit, Cleveland, Ohio, Jul. 13-15, 1998, AIAA-98-3604 (12 pp.).

"MSET Modeling of Crystal River-3 Venturi Flow Meters" by J. P. Herzog, S. W. Wegerich, K. C. Gross, and F. K. Bockhorst, 6th International Conference on Nuclear Engineering, ICONE-6169, May 10-14, 1998, Copyright © 1998 ASME (12 pp).

* cited by examiner

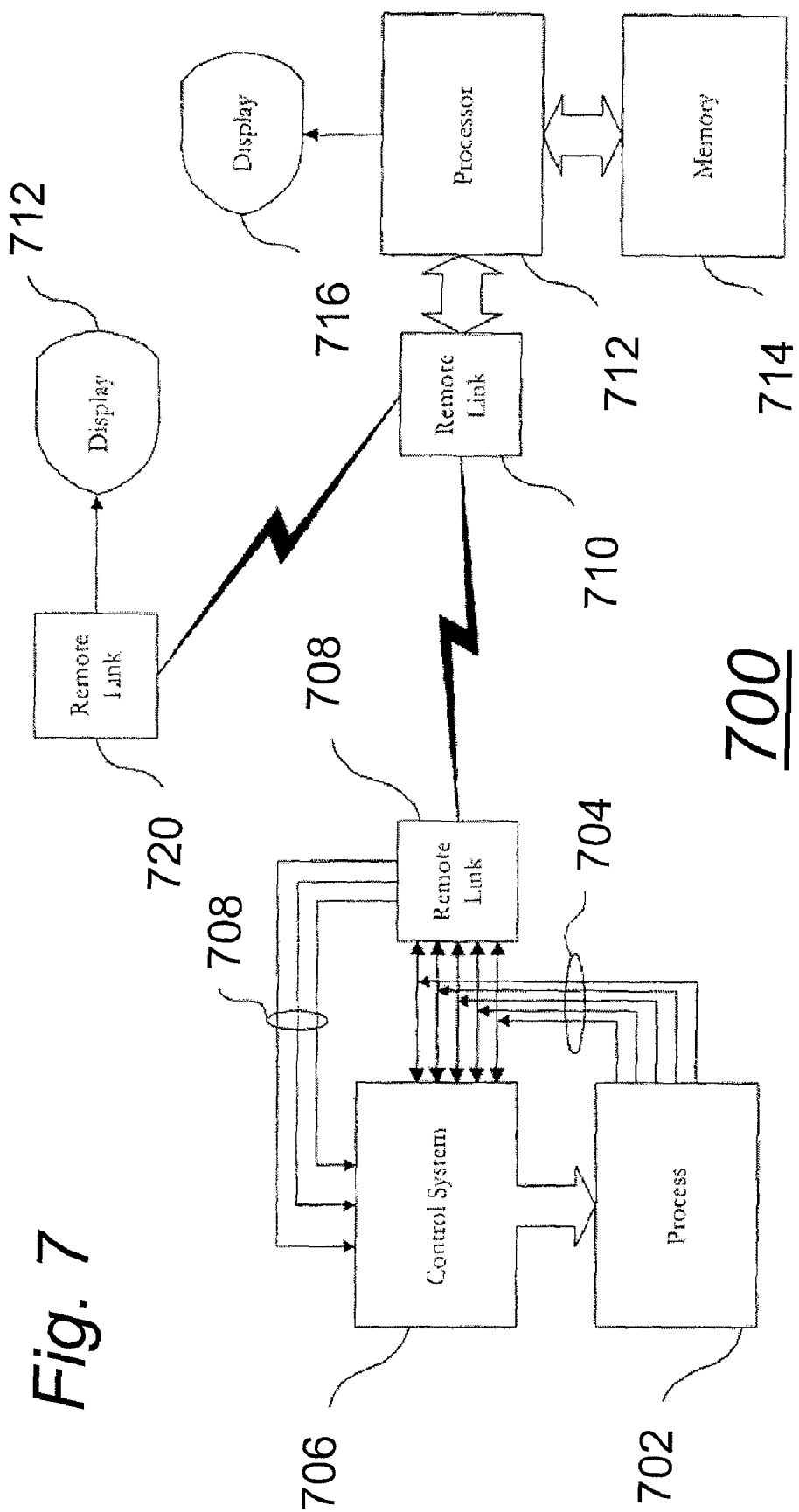

SYSTEM FOR EXTRACTION OF REPRESENTATIVE DATA FOR TRAINING OF ADAPTIVE PROCESS MONITORING EQUIPMENT

CROSS REFERENCE TO RELATED APPLICATIONS

This application claims the benefit of priority under 35 U.S.C. §119(e) to U.S. Provisional application Ser. No. 60/187,959 filed Mar. 9, 2000.

BACKGROUND OF THE INVENTION

1. Field of the Invention

The present invention relates generally to equipment and process monitoring, and more particularly to monitoring systems instrumented with sensors that measure correlated phenomena. The present invention further relates to modeling instrumented, real-time processes using the aggregate sensor information to ascertain information about the state of the process, and a method of training an empirical model used therein.

2. Description of the Related Art

Conventional methods are known for monitoring equipment or processes—generically "systems"—using sensors to measure operational parameters of the system. The data values from sensors can be observed directly to understand how the system is functioning. Alternatively, for unattended operation, it is known to compare sensor data values against stored or predetermined thresholds in an automated fashion, and generate an exception condition or alarm requiring human intervention only when a sensor datum value exceeds a corresponding threshold.

A number of problems exist with monitoring systems using thresholds. One problem is the difficulty of selecting a threshold for a dynamic parameter that avoids a burdensome number of false alarms, yet catches real alarms and provides sufficient warning to take corrective action when a system parameter—as measured by a sensor—moves outside of acceptable operation. Another problem is posed by sensor failure, which may result in spurious parameter values. It may not be clear from a sensor data value that the sensor has failed. Such a failure can entirely undermine monitoring of the subject system.

In systems with a plurality of sensors measuring correlated phenomena in the system, it is known to use certain methods to consider all sensors in aggregate to overcome some of these problems. By observing the behavior of all the sensor data values in aggregate, it can be possible to dramatically improve monitoring without suffering unduly from false and missed alarms. Also, knowledge of how all the correlated parameters behave in unison can help determine that a sensor has failed, when isolated monitoring of data from that sensor would not in and of itself indicate the sensor failure.

Known methods for viewing aggregate sensor data typically employ a modeling function that embodies prior knowledge of the system. One such technique known as a "first-principles" model requires a well-defined mathematical description of the dynamics of the system selecting system snapshots taken at minimum and maximum system parameter excursions. The mathematical model is used as a reference against which current aggregate sensor data can be compared to view nascent problems or sensor failures. However, this technique is particularly vulnerable to even the slightest structural change in the observed system and may not provide sufficient system characterization in operating regions where system parameters vary most dynamically. The mathematical model of the system is often very costly to obtain, and in many cases, may not be reasonably possible at all.

Another class of techniques involves empirically modeling the system as a "black box", without discerning any specific mechanics within the system. System modeling using such techniques can be easier and more resilient in the face of structural system changes. Modeling in these techniques typically involves providing some historic sensor data corresponding to desired or normal system operation, which is then used to "train" the model.

One particular technique is described in U.S. Pat. No. 5,987,399, the teachings of which are incorporated herein by reference. As taught therein, sensor data is gathered from a plurality of sensors measuring correlated parameters of a system in a desired operating state. This data is used to derive an empirical model comprising certain acceptable historical system states. Real-time sensor data from the system is provided to a modeling engine embodying the empirical model, which computes a measure of the similarity of the real-time state to all prior known acceptable states in the model. From that measure of similarity, an estimate is generated for expected sensor data values. The real-time sensor data and the estimated inspected sensor data are compared, and if there is a discrepancy, corrective action can be taken.

Other empirical model-based monitoring systems are disclosed in U.S. Pat. No. 4,937,763 to Mott, wherein learned observations are employed in a system state analyzer, and U.S. Pat. No. 5,764,509 to Gross et al., the teachings of which are hereby incorporated by reference. Selection of the appropriate historical sensor data for generating any of these empirical models is a serious hurdle. The models variously rely on the historic data accurately representing the "normal" conditions of the process or machine being monitored. Therefore, one must ensure that the data collected as historic data corresponds to an acceptable state of operation, and not one in which a latent fault was present in the process or machine. A larger problem is then to ensure that the historic data is sufficiently representative of the expected ranges of operation, so that the empirical model does not generate alarms for states of operation it has no history for, but which are otherwise acceptable states for the process or machine. It is critical to the success of the empirical model for monitoring that the collected sensor data be properly distilled or condensed to a trained set of data that adequately represents the knowledge of the normal states of operation of the process or machine being monitored. An additional problem is that, since empirical modeling methods can be computationally demanding, it is often preferable to restrict the historic data on which they are built or trained to a minimum, in order to reduce training time and required computing power. Finally, some empirical models are actually adversely affected by too much training data: They tend to find every current state of the monitored process or machine acceptable, because something close enough to it can be found in the historic data. Therefore, a successful selection of representative "training set" data must not result in an "overtrained" model.

In U.S. Pat. No. 5,764,609 to Gross et al., a training method for selecting observations of time-correlated sensor data called Mim-Max is presented. According to this way of training a model, the collected normal sensor data is condensed or distilled down to a "training set" by selecting those observations (or "snapshots") that contain a global maximum or minimum for a sensor with respect to all values taken on by that sensor across the entire collected sensor data. Thus, as a maximum the number of observations that are included in the training set that results from the training is twice the number of sensors being modeled. While this method assures the inclusion of extrema for all sensors in the model, it may be desirable to enhance the model with inclusion of other snapshots with intermediate values.

Therefore, when selecting vector-arranged snapshot data for inclusion in a training set for deriving an empirical model, there is a need for selecting an optimized training set that best characterizes the dynamics of the underlying machine or process. There is a further need for a method for selecting historic data that minimizes the size of the training set. Finally, there is a need for training methods that are computationally efficient and fast. This invention achieves these benefits by automating selection in a way that maximizes the data membership from regions of great dynamics, while keeping the overall training set size manageable.

SUMMARY OF THE INVENTION

The invention provides several benefits for building a representative training set from a larger data collection for empirical modeling of a process or machine. In generating an empirical model for monitoring, controlling or optimizing the operation of a process or machine (industrial or otherwise), the invention provides a novel and improved means for identifying and selecting a training set from a large volume of historic data of the process or machine. Historic data is collected as snapshots of time-correlated sensor data from the process or machine. The sensors can be of any type, measuring any kind of physical or derived parameter. The collected data can be provided in time sequence or out of sequence without affecting the results produced by the invention.

Briefly summarized, the present invention selects appropriate modeling data from a collected data set to characterize a modeled process. Typically, the data is correlated sensor data, representing parametric conditions at a multitude of snapshots of a system, machine or process parameters. More observations are selected for inclusion in the model for ranges of sensor values where that data exhibits greater dynamics, while including less data from stable ranges of little change. The system of the present invention can be a computer running a program in software and the computer may simply be a microprocessor.

According to the present invention, the distribution of chosen vectors may be varied to suit the specific needs within a training set. For example, selected training set vectors can be evenly spaced along the value range of a specific variable on the y axis, or chosen as population of controlled entities by using a distribution along the x axis. Several nonlinear variations of the invention may be applied to either axis, including a Gaussian distribution, grouping vectors into narrow ranges coupled with random selection from the entire vector population, and randomly selecting n vectors from each range, where n is a function of vector population. Thus, a set of vectors may be chosen to fully represent the range of each variable, providing full range modeling capability, while including a number of closely spaced observations (represented by the selected vectors) centered about the mean of the data. Conversely, the resolution can be enhanced selecting only a few samples at the mean where variation is expected to be fairly minor to allow greater precision in specification of values at the edges of the data set. Thus, very high model fidelity is achieved for normal operation with minimal growth of the training matrix or the G matrix derived therefrom. In addition, it is possible to use different criteria for each variable in the observation vector, giving the user great customization capability.

Thus, it is a purpose of the invention to automate sensor snapshot selection to maximize the data membership from regions of great dynamics, while keeping the overall training set size manageable;

It is another purpose of the invention to selectively highlight certain variables or parameter sensors thereby weighing some more than others and so, emphasizing certain data regions more in the training set;

It is yet another purpose of the invention to provide the flexibility to work with many different data types and many different relationships between the variables within a data collection.

Advantageously, the present invention is particularly valuable when it is important to tune the operation of a similarity operator to meet requirements which include memory footprint constraints and model performance is important.

The described embodiment is a system that employs a set of user-defined parameters to select a training set from a data collection. The invention may be enabled in performing the selection process in concert with a software or hardware based data storage system.

Preferably, each parameter variable in a data collection is treated equally with every other parameter or variable and the same number of observation points are selected from each at equally spaced intervals of magnitude.

BRIEF DESCRIPTION OF THE DRAWINGS

The novel features believed characteristic of the invention are set forth in the appended claims. The invention itself, however, as well as the preferred mode of use, further objectives and advantages thereof, is best understood by reference to the following detailed description of the embodiment in conjunction with the accompanying drawings, wherein:

FIG. 7 shows an example wherein a monitored process is shown to be instrumented with sensors having output leads and a training set derived according to the present invention is used in monitoring the system;

DETAILED DESCRIPTION OF THE PREFERRED EMBODIMENTS

The present invention is a method system and program product for distilling a training set from a collection of data. According to the invention, for each sensor or parameter provided in the model, all collected snapshots are arranged in a sequence that orders the sensor of interest according to magnitude. The ordered snapshots are then chosen for inclusion in the final training set used as the basis for the empirical model, by segmenting the magnitude axis into equal-spaced segments, and identifying one snapshot for each segment. This is performed for each sensor. More specifically, the magnitude axis is divided into equal segments, and the snapshot with the magnitude for the sensor of interest that is closest to any segment divider value is included in the training set in its entirety. The training set selection can be done on processed or unprocessed data. The data is analyzed and the training set is selected by dividing the data, uniformly or non-uniformly, into as many discrete bins as would yield the desired size for the training set. Various nonlinear options may be selectively included for focusing the behavior of the resulting model to suit specific application needs.

Figure 1:
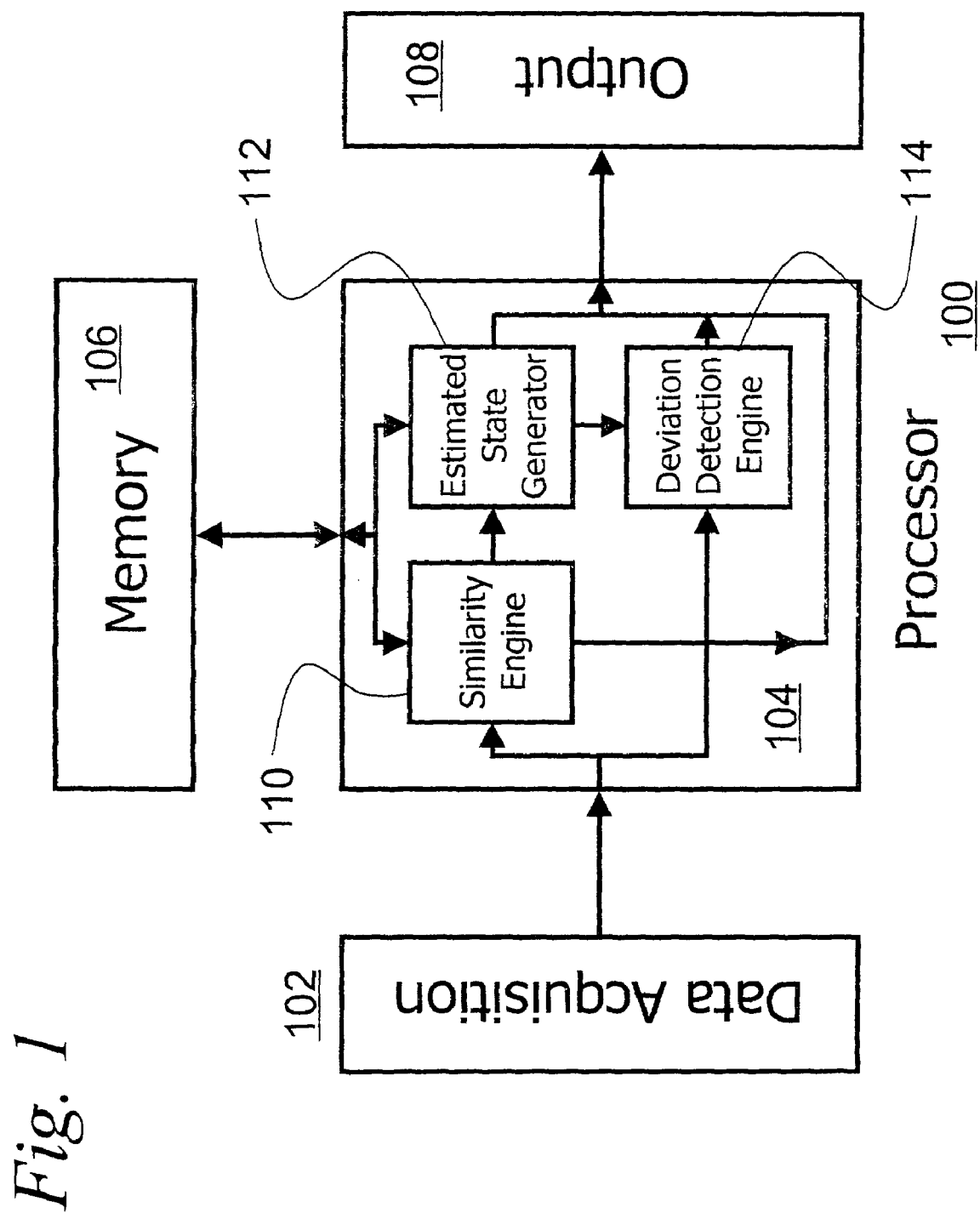
FIG. 1 shows an empirical model-based monitoring system for which a training set may be derived according to the preferred embodiment of the present invention.

The invention is beneficially understood in the context of the empirical model-based monitoring system for which it can provide a training set. Turning to FIG. 1, such a monitoring system is shown to comprise a data acquisition module 102, an information processor 104, a memory 106 and an output module 108, which can be coupled to other software, to a display, to an alarm system, or any other system that can utilize the results, as may be known in the art. The processor 104 generally may include a similarity engine 110, an estimated state generator 112 and a deviation engine 114.

Memory 106 stores a plurality of selected time-correlated snapshots of sensor values characterizing normal, optimal, desirable or acceptable operation of a monitored process or machine. This plurality of snapshots, distilled according to a selected "training" method as described herein, comprises an empirical model of the process or machine being monitored. In operation, the inventive monitoring system 100 samples current snapshots of sensor data via acquisition module 102. For a given set of time-correlated sensor data from the monitored process or machine running in real-time, the estimates for the sensors can be generated by the Estimated State Generator 112 according to:

$$\vec{y}_{estimated} = \overline{D} \cdot \vec{W}$$

where D is a matrix comprised of the plurality of snapshots in memory 106 selected according to training, and W is a contribution weighting vector determined by Similarity Engine 110 and Estimated State Generator 112 using a similarity operator such as the inventive class of similarity operators of the present invention. The multiplication operation is the standard matrix/vector multiplication operator. W has as many elements as there are snapshots in D, and is determined by:

$$\vec{W} = \frac{\hat{W}}{\left(\sum_{j=1}^{N} \hat{W}(j)\right)}$$

$$\hat{W} = (\overline{D}^T \otimes \overline{D})^{-1} \cdot (\overline{D}^T \otimes \vec{y}_{in})$$

where the T superscript denotes transpose of the matrix, and Y(in) is the current snapshot of actual, real-time sensor data. The symbol "⊗" in the equation above represents the improved similarity operator of the present invention. Y(in) is the real-time or actual sensor values from the underlying system, and therefore it is a vector snapshot.

The similarity operation typically returns a scalar value between 0 and 1 for each comparison of one vector or matrix row/column to another vector. It represents a numeric quantification of the overall similarity of two system states represented by two snapshots of the same sensors. A similarity value closer to 1 indicates sameness, whereas a similarity value closer to 0 typically indicates difference. A variety of techniques that implement a similarity operator are known, such as BART in U.S. Pat. No. 5,987,399, as well as that described in U.S. Pat. No. 5,764,509.

Deviation detection engine 114 receives both the actual current snapshot of sensor values and the set of sensor value estimates from the estimated state generator 114, and compares the two. A variety of tests can be used, including the sequential probability ratio test, or a CUSUM test, both of which are known in the art.

Figure 2:
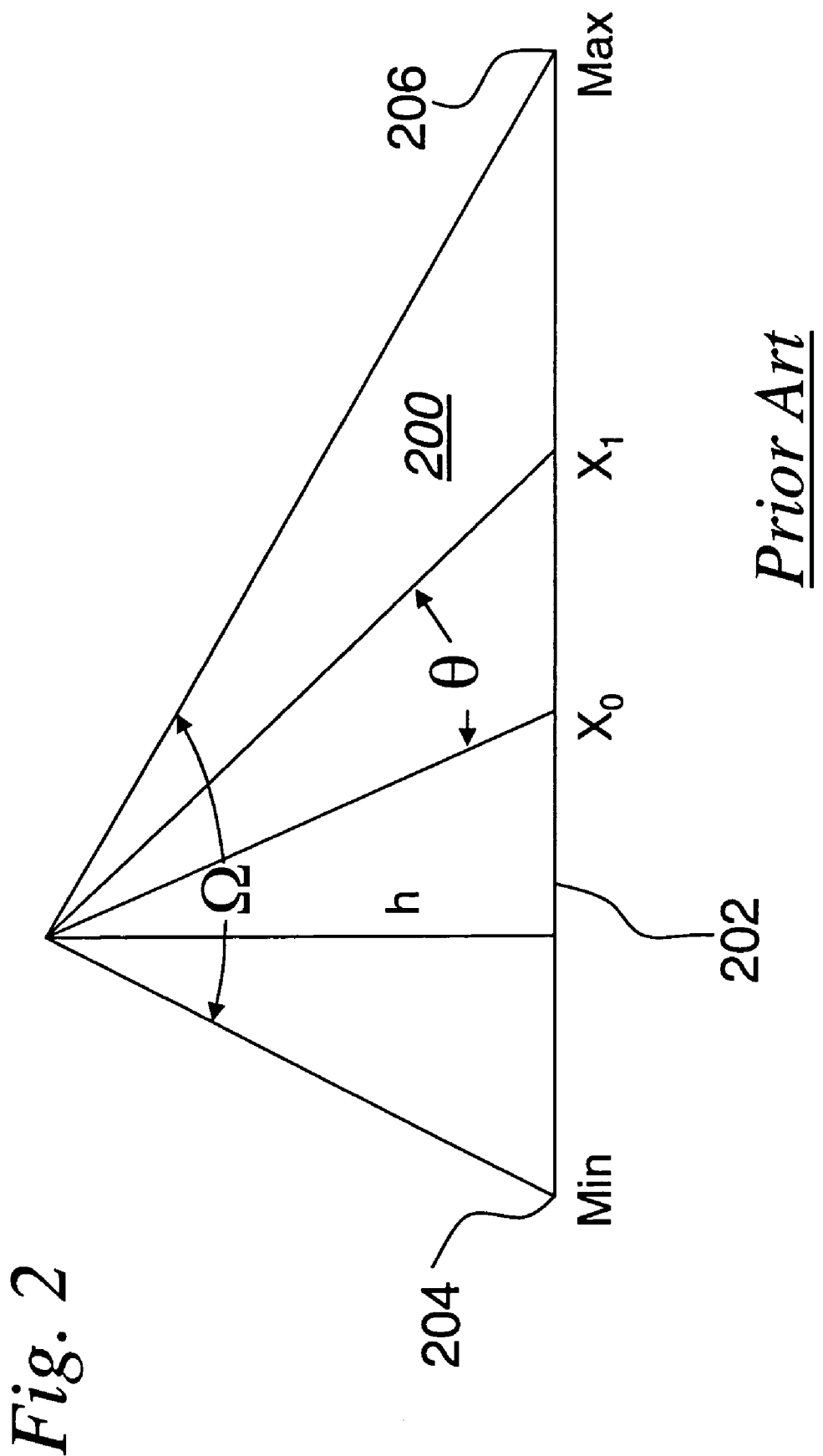
FIG. 2 shows an example wherein two independent vectors are checked for similarity using the prior art BART technique.

FIG. 2 illustrates the BART technique as described in U.S. Pat. No. 5,987,399, the teachings of which are incorporated herein by reference, wherein triangle 200 is formed having a linear base 202 bounded in training data by the range for a given sensor, the range min and max forming vertices 204, 206 at opposite ends of the base. The triangle 200 was formed as a right triangle, and the location of the right angle was located a height h above the median of the range data along the base 202. The height h was required to be chosen so that the apex angle is a right angle. To perform a similarity operation on two snapshots, then, corresponding elements of the snapshots are individually compared for similarity using this triangle 200. For a given sensor, a first sensor value $X_0$ from the first snapshot and a second sensor value $X_1$ from the second snapshot are plotted along the base 202 according to where they fall between the minimum MIN and maximum MAX values for that sensor across the entire training set. This generates an angle theta ($\theta$) that is compared to angle omega ($\Omega$). A relatively small $\theta$ indicates high similarity of the sensor values, whereas a large $\theta$ relative to $\Omega$ indicates low similarity. The elemental similarity for the pair of sensor values is averaged with analogously derived elemental similarities for other sensor value pairs in the two snapshots to provide an overall vector-to-vector similarity score.

Figure 3:
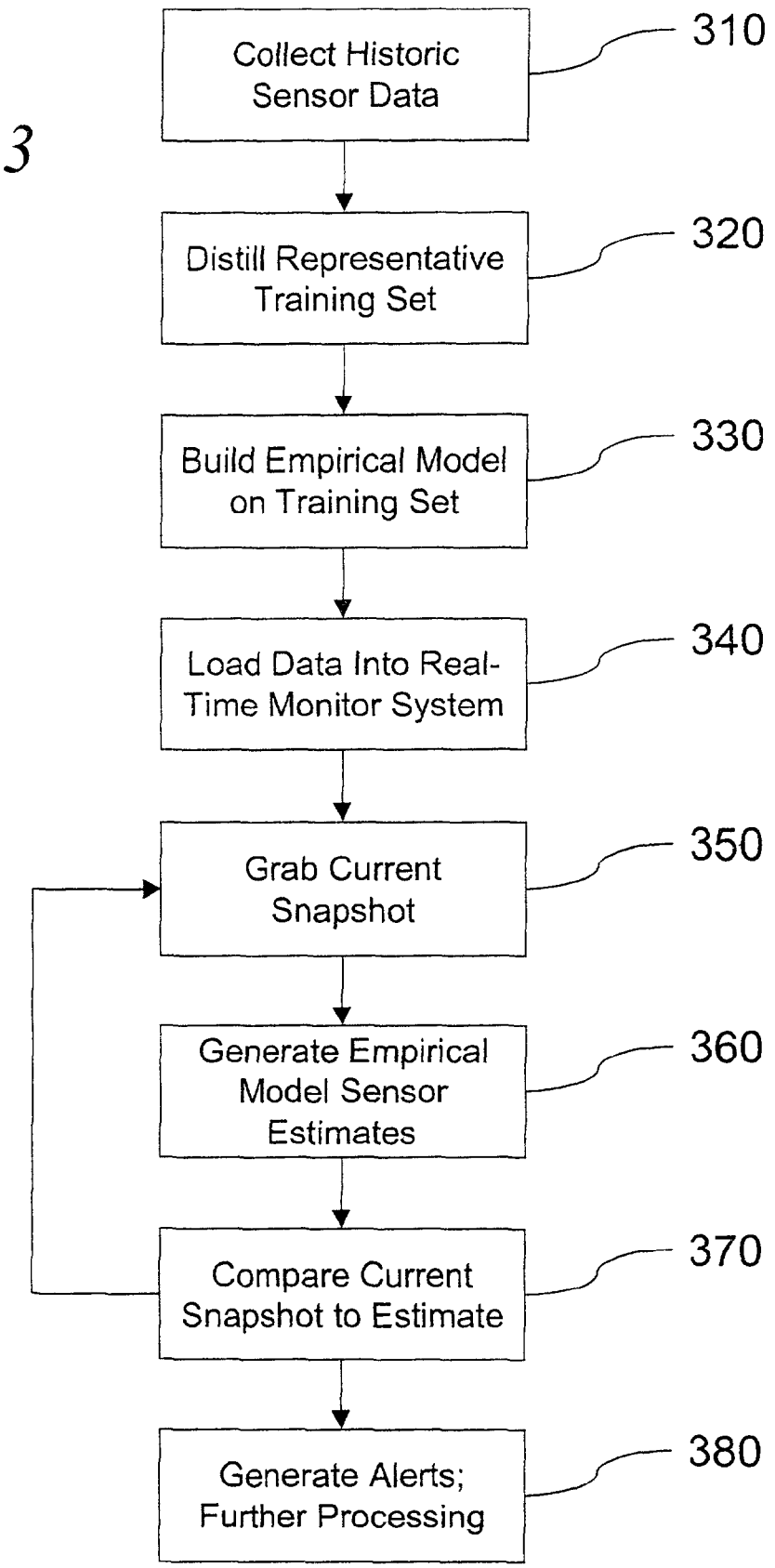
FIG. 3 is a flowchart of a method of generating and employing an empirical model for process or machine monitoring.

The operation of the monitoring system can be better understood with examination of FIG. 3, which is a flowchart describing a method of generating and employing an empirical model for process or machine monitoring. In step 310, data is collected from the instrumented process or machine, while it is operating through all of its acceptable dynamic ranges. The data takes the form of snapshots of time-correlated data, which can be treated as one-dimensional arrays or vectors. This historic data may comprise a huge volume of snapshots. It is distilled in step 320 according to the invention to a subset of snapshots (a "training set") sufficiently representative of the expected dynamic ranges of operation of the process or machine. The training set may comprise a mere fraction of the original historic data set. In step 330, the training set is used to build an empirical model using one of a variety of available empirical modeling techniques. Once the empirical model is built, the data representing it can be loaded in step 340 to a real-time monitoring system, typically a computer platform adapted to received real-time sensor data from the process or machine. Real-time monitoring begins in step 350 with capturing a current snapshot of the same sensors or parameters that were used in the training set data. In step 360, the empirical model operates on the current snapshot to generate a set of estimates for the sensors or parameters. This is the estimation by the model of what values these sensors should have based on what is being reported. These estimates are compared to the actual current sensor data in step 370.

Alerts are generated as indicated and other post-processing for display or control purposes is carried on in step 380. Monitoring continues with step 350, where the next current snapshot is captured.

The present invention may be used with technology like BART and that described in U.S. Pat. No. 5,764,509 (MSET), the teachings of which are incorporated by reference. Such systems as MSET and BART employ empirical modeling in conjunction with a statistical hypothesis test to yield excellent sensitivity to incipient changes in the operational state of a monitored process or machine. The statistical hypothesis test can be the Sequential Probability Ratio Test (SPRT), which accepts two inputs to determine if they are the same or different with statistical confidence. Real-time sensor data, or a source of actual parametric data, provides one input to SPRT. The empirical model provides another input, by generating an estimate from the real-time sensor values or actual parametric data values.

The empirical model is achieved by selecting past history data that reflects desired states of operation for a process or machine that is monitored with sensors and SPRT. The empirical model in a sense has "learned" the known operational states of the process or machine from this historic data.

Typically, when creating or "training" an empirical model as described in the aforementioned patents, a large amount of available data from the process or machine must be distilled to a computationally manageable "training" set. The training set must still be sufficiently representative of the full dynamic ranges of the process or machine that the empirical model can render reasonable estimates in real-time for sensor values. Known methods for doing this include the aforementioned "Min-Max" procedure described in U.S. Pat. No. 5,764,509. According to this procedure, data is selected that includes all minima and maxima for each measured parameter included in vectors in the available data.

Figure 4:
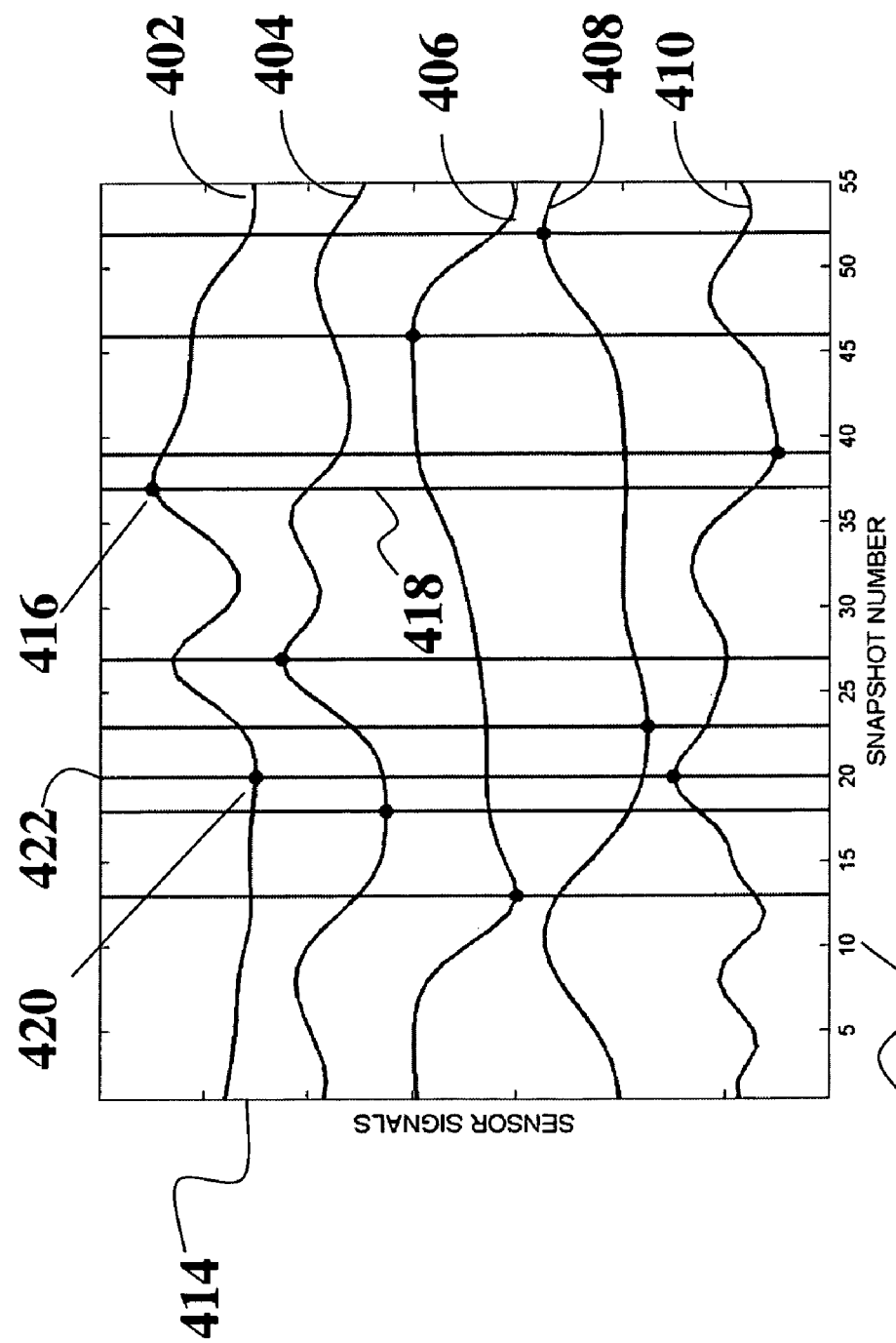
FIG. 4 shows a prior art method for selecting training set vectors for distilling the collected sensor data to create a representative training data set.

FIG. 4 graphically depicts the MIN-MAX selection method of the prior art for distilling the collected sensor data to create a representative training data set. In this example, only five sensor signals 402, 404, 406, 408 and 410 are shown for a system, process or machine. On the abscissa axis 412 is the sample number or time stamp of the collected sensor data, where the data is digitally sampled and the sensor data is temporally correlated. The ordinate axis 414 represents the magnitude of each sensor reading at the particular sample or snapshot. Each snapshot represents a vector of five elements, each element corresponding to a reading for a sensor in that snapshot. Of all the sensor data collected (in all of the snapshots), according to the prior art training method, only those five-element snapshots are included in the representative training set that contain either a global minimum or a global maximum value for any given sensor. Therefore, for sensor signal 402 the global maximum 416 qualifies the five sensor values that intersect with line 418 including global maximum 416, for inclusion in the representative training set as a five element vector. Similarly, for sensor signal 402 the global minimum 420 qualifies the five sensor values that intersect with line 422 for inclusion in the vector training set. So, collections of such snapshots represent states the system has taken on and that are expected to reoccur. The pre-collected vectors are further filtered to produce a "training" subset that reflects all min/max states that the system is known to take on while operating "normally" or "acceptably" or "preferably". This training set forms a matrix, having as many rows as there are sensors of interest, and as many columns (snapshots) as necessary to capture all the minimum and maximum states without redundancy.

The training matrix of observed acceptable states is referred to as "D" and allows a computation of an expected snapshot given the real-time actual snapshot of the underlying system in operation. The present invention can be applied to this acceptable state matrix D, selectively augmenting it with snapshots from system operating regions of particular interest, e.g., dynamic regions of parameter sensitivity or at parametric extremes. Thus, additional snapshots may be included in the acceptable state matrix D, thereby, allowing determination of a much more refined and precise expected snapshot.

These prior methods of automating data selection from available historic data are adequate, but still have shortcomings. Min-Max typically selects an insufficiently descriptive training set for optimal modeling, for all but the least dynamic of systems. Vector Ordering produces a training set much more representative of the dynamics of the system, but not in a way that is specific to particularly dynamic sensors.

The present invention overcomes these shortcomings, to produce a training set from historic available data that is fairly representative of the dynamics of the monitored process or machine, yet computationally manageable. Parameter data are gathered from signal sensors monitoring a system such as a machine, process or living system. The number of sensors used is not a limiting factor, generally, other than with respect to computational overhead. The present invention is highly scalable. The sensors should capture component parameters of at least some of the primary "drivers" of the underlying system. Furthermore, all sensor inputs to the system are best interrelated in some fashion (non-linearly or linearly).

As used herein, the word "sensor" is not intended to be restrictive but to indicate the source of system, process or machine parameter data and is intended to be taken to mean, generally, any kind of collected data taken and collected by an means. Thus, sensor data may include, for example, a digitally converted value from a real-time sensor, a sensor datum stored in a computer file, or some other type of data that may measure parameters of a system or process without actually requiring a physical sensor, e.g., collected stock market data or network packet data. It is intended that the current invention has application to all of these kinds of data for choosing an appropriate training set.

According to the present invention, available historic data is maintained in the form of snapshots of sensor or other parametric data, each snapshot having the same number of parametric data values. The parametric values are arranged as a vector, with corresponding parametric values as elements in the same position in each vector from snapshot to snapshot. That is, for example, the first element in all historic available data arranged as snapshot vectors may be designated to be the temperature reading from sensor A, the second element may be designated to always be the pressure reading from sensor B, etc.

For each sensor for which it is desirable to include more collected snapshots in the resulting training set to provide better characterization of the dynamics of the sensor in dynamic regimes, the range of values of that sensor is determined over the set of all the collected snapshots. Alternatively, a range can be an expected range, based on knowledge of the application environment. This range is then divided into intervals. Preferably, in order to best capture the dynamic regions of the range, the intervals are equal intervals, however they can be based on other criteria as well. The set of all collected snapshots is then reviewed, examining the value in each snapshot of that particular sensor, and one is selected for each interval, for inclusion in the training set. The value that falls closest to the upper or lower edge of the interval, or the middle of the interval, can be used to determine which snapshot will be selected for each interval. The size of the interval should be selected in view of the total number of snapshots in the collection, as well as the desired amount of augmentation of a training set already populated by the Min-Max method. A preexisting training set derived from Min-Max training does not need to be formed in order to use the present invention: The entire training set can be selected by means of this invention. In fact, when the intervals are set up such that they include the least and greatest bound of the data for a given sensor in the collected set, the Min-Max snapshots are thereby naturally included as a result.

The method of selecting snapshots for inclusion in the training set can be better understood by visually ordering the values of the sensor from the snapshots in increasing amount, and graphically indicating which are selected using equally spaced intervals.

Figure 5:
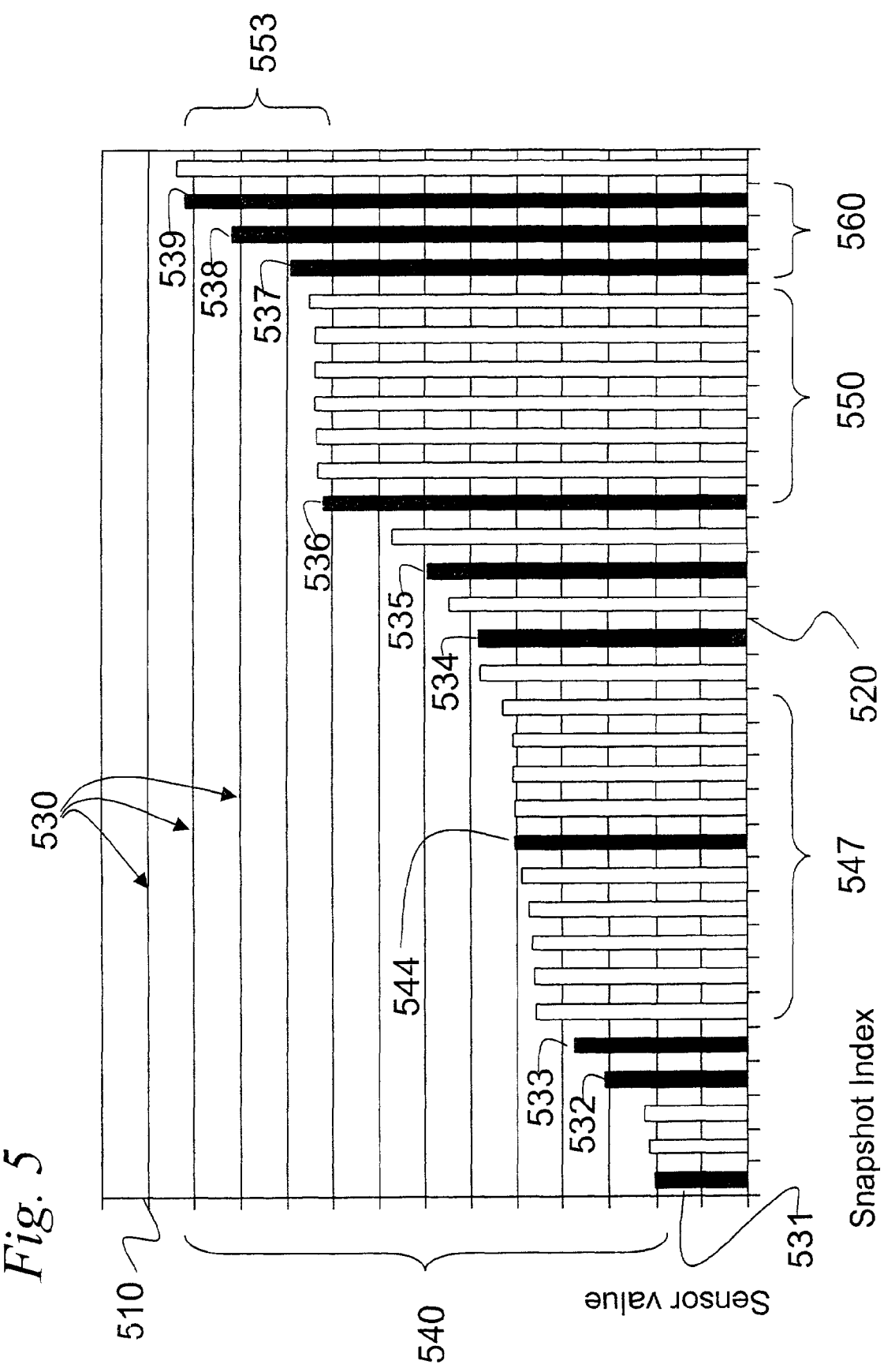
FIG. 5 graphically depicts a sequence of values as a bar chart ordered with increasing parameter height.

After arranging the vectors in parameter value ascending or descending order, only the scalar value of the parameter of interest in that iteration is used. FIG. 5 graphically depicts a sequence of values as a bar chart ordered with increasing parameter height. In this example, the Y-axis 510 represents the magnitude of the particular parameter, e.g., temperature, pressure or the like. The X-axis 520 is merely a sequential list of the vectors, i.e., sequence number. In the most general sense, historic snapshots are selected for inclusion in a training set according to the present invention, by iterating a selection procedure for each parameter or vector element. For each parameter, the entire available data set is arranged in an ascending or descending order of that particular parameter's magnitude.

Then, the magnitude along the Y-axis is then divided up equally into bins, each represented in the present example by equally spaced horizontal lines, e.g. 530, that cross the entire chart. Additional vectors 531, 532, 533, 534, 535, 536, 537, 538, 539 and 544 are selected for inclusion in the acceptable state matrix D, if the scalar value in that vector for the particular parameter of interest is closest to one of the bin boundaries 530. For each bin boundary line 530, only one vector can be chosen. In the most general sense, the scalar of interest (i.e. the parameter value) can be more than or less than the bin boundary value, so long as the absolute value of the difference is the smallest amount among all the scalars of interest.

In this example, those vectors that are selected for inclusion according to this invention are shown in solid black. The bins intervals along the Y-axis between lines are all equal, although this is not necessarily a requirement.

Advantageously, using this method, the training set includes more vectors where the sensor value of the sensor in question comes from the range over which fewer vectors span a large y-axis regime. For example, over the total range of values 540 for the sensor in the collected set, one vector 544 is selected over the set of vectors 547 that have sensor values falling around that value. Similarly, over the set of vectors 550, only one vector is selected for inclusion. However, in the value range 553, only a minimal set 560 of vectors populated the range, and most were selected for inclusion, thereby better representing that range.

This binning procedure is carried out for each parameter or vector element, selecting vectors for each. Then, the selected sets of vectors for each parameter are combined, any duplicates are eliminated, and the resultant set of vectors, or snapshots, is the preferred training set. This preferred training set may be used in the empirical modeling described in the aforementioned patents, or in any similar such system monitoring to achieve enhanced monitoring sensitivity for any process, machine or system.

A bin interval may be along the y-axis chosen for each parameter. Some system parameters may be known as dominant drivers in the dynamics of the underlying system, process or machine, and so, it may be preferable to emphasize those while deemphasizing others, including selecting more vectors for those dominant drivers. In this case, the bin interval for dominant drivers may be of a much finer resolution than for other parameters, resulting in more vectors being selected, finely covering the dynamic range for dominant drivers, than for other more coarsely monitored system parameters.

Figure 6A:
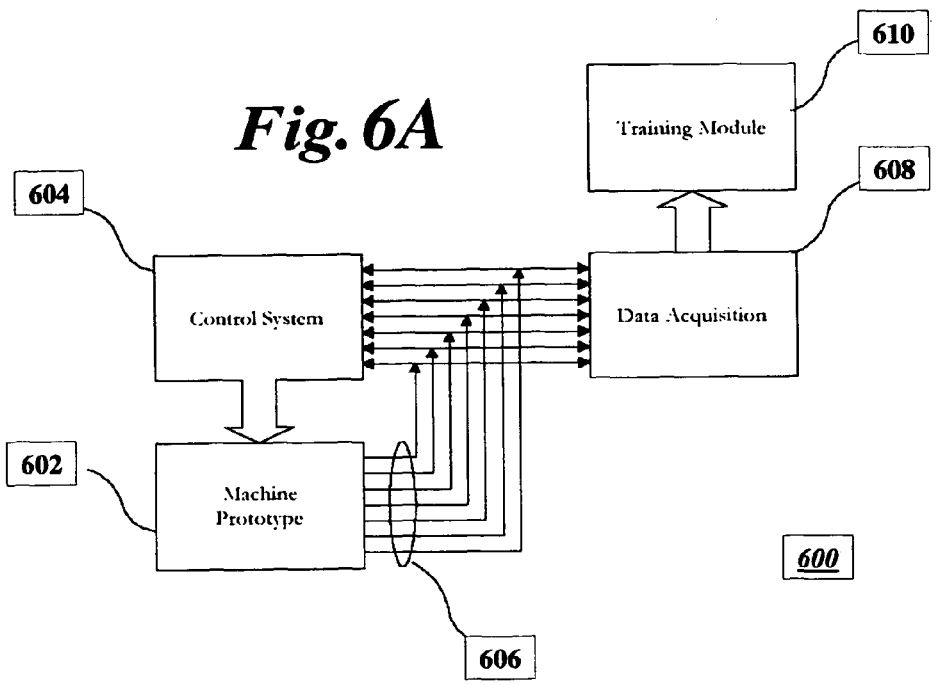
FIG. 6A shows a block diagram of an exemplary laboratory workbench arrangement for gathering process or machine behavior data for distillation.

Turning to FIG. 6A, a block diagram of an exemplary laboratory workbench arrangement 600 is shown for gathering system, process or machine behavior data for distillation. In this example, the monitored system is depicted as a machine prototype 602 and may be, for example, a combustion engine, an electric motor, a pump, a compressor, a refrigerator, and so on. It is understood that, as further indicated hereinabove, the monitored system may be any machine, living system or system carrying out a process. In this example, the machine 602 is labeled a prototype, but importantly, it should generate sensor data that is substantially the same as the actual parameter values expected in a production model of the machine, as would be measured by the same sensors. Of course, the training may be in situ wherein the prototype is a production model itself, and ideally, not different in any way from other production models. In addition when sufficient system data has already been accumulated that previously accumulated data may be used as the training data source, the prototype machine being a virtual machine derived from the production machine contributing data to the accumulation.

The machine 602 may be connected to and controlled by a control system 604, generally comprising a microcontroller- or microprocessor-based digital system with appropriate analog/ digital and digital/ analog inputs and outputs are known to those skilled in the art. Machine 602 is instrumented with sensors monitoring machine components or reactions thereto (e.g., chamber temperature or pressure) and providing resultant sensor values along outputs 606. During training, the machine 604 is operated through an expected range of operations, and data acquisition system 608 records values of all sensors 606 with which machine 602 is instrumented. Additionally, control signals from control system 604 may also be recorded by data acquisition system 608, and may be used as "sensor signals" that correlate with the other sensor signals.

Data acquired by data acquisition system 608 can accordingly be processed using a computer module 610 for producing a distilled training set of data representing the operational ranges of machine 602, using the training method described herein.

The monitoring system described herein includes an empirical modeling engine and a statistical decision-making engine supported by a suite of software routines for data preconditioning, training, and post-decision reporting. This system is modular and can be applied separately depending on the requirements of the particular monitoring application. Typically, process monitoring equipment employs sensors having some common characteristics. A set of sensor data is acquired as being representative of the normal or desired operation range of the system which is made available for training as described for FIG. 3. The sensors chosen for the model should be correlated, either linearly or nonlinearly. Generally, multiple sensor inputs may be necessary, however, the described algorithms may apply to single sensor applications by using signal decomposition of the sensor signal into components which can be treated as multiple, correlated inputs for modeling and monitoring. The identification of small deviations in signals from normal operation is provided as indicative of the status of the sensor's associated physical parameters.

Figure 6B:
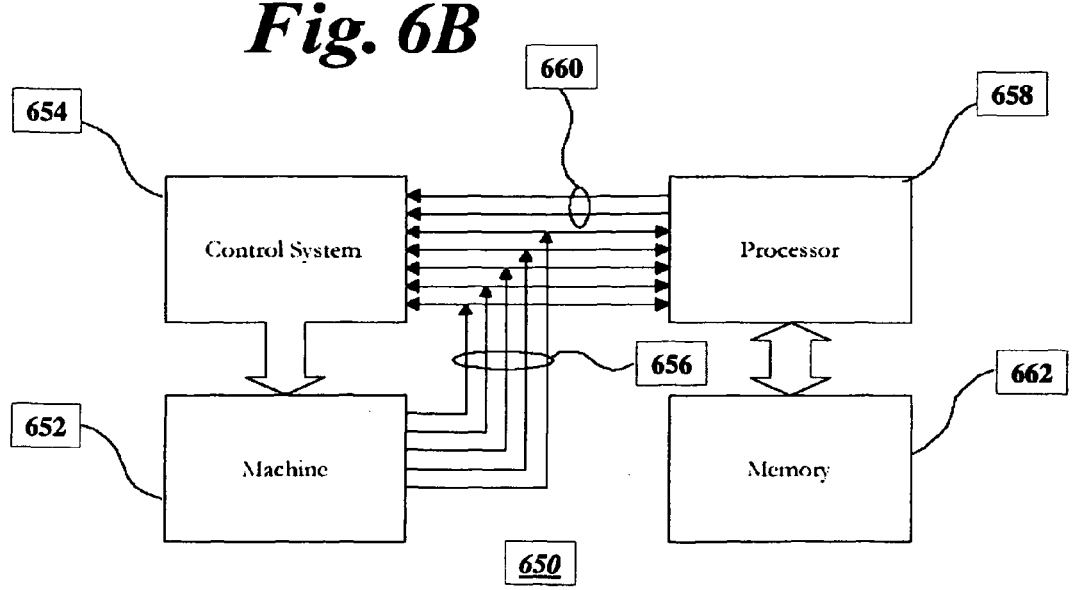
FIG. 6B shows an example of an exemplary monitoring system with an on-board processor and a training set selected according to a preferred embodiment of the present invention.

Thus, an evaluation system 650 with an on-board processor is shown in FIG. 6B, wherein a system, machine or process 652 is controlled by a control system 654 that is located on the machine. Machine 652 is instrumented with sensors for some of the physical or logical parameters of interest in controlling the machine, and the outputs for these sensors are shown as output conductors 656, which feed into the control system 654. These are also passed to a processor 658 located within or on the machine 652, disposed to execute a computing program for monitoring sensor signals and an optional computing program for generating a set 660 of virtual signals on the output conductors 656. The processor 658 is connected to a local memory 662, also on or in the machine 652, which stores data comprising the training set distilled according to the present invention to represent the expected operational states of the machine 652. Advantageously, memory 662 can also store programs for execution by the processor 658. Virtual signals 660, if included, previously generated by the processor 652 are provided to the control system 654, in lieu of genuine sensor values. Generation of virtual sensor estimates using the improved similarity operator of the present invention can be more fully understood with reference to copending patent application Ser. No. 09/718,592 of Wegerich, filed Nov. 22, 2000, and entitled "Inferential Signal Generation for Instrumented Equipment and Process." Virtual signals may be generated as a cost saving measure or 658 for unmonitorable physical or logical machine parameters.

Processor 658 can also be a part of the control system 654, and in fact can be the processor on which the control system routines are executed, in the event the control system 654 is a digital computer control system. Ideally, the processor 658 and memory 662 are powered by the same power source as the control system 654. However, under certain circumstances, it may also be preferable to provide for a processor 658 and memory 662 independent from the processor and/or memory of the control system 654, in order to provide virtual signals 660 in a timely fashion, as though they were truly instrumented parameters. As an example, it may be necessary that processor 658 must operate at a higher clock speed than the control system processor.

FIG. 7 shows an example 700 wherein a process 702 is instrumented with sensors having output leads 704. These leads 704 provide sensor signals to a control system 706 that controls the process 700. These signals 704 are also provided to a remote communications link 708, which is disposed to communicate digital prior signal values to a second remote communications link 710, located at a physically remote place. A processor 712 may be included, which may act as a software controlled computer using the sensor signals received by link 710, optionally, to monitor the process 702 for sensor failures, process upsets or deviations from optimal operation and optionally generate virtual sensor signals indicative of an inferred physical parameter of process 702. A memory 714 is provided to store training set data representative of the expected operational behavior of the process 702, selected according to the present invention.

Furthermore, a display 716 may be provided at the remote location for displaying data descriptive of the process 702, i.e. sensor signals 704 and any virtual signals derived therefrom or both. The virtual signals generated by processor 712 can also be transmitted from link 710 back to link 708 and input over leads 718 to control system 706 for advantageous control of the process. Data from original sensor signals and/or virtual sensor signals can also be transmitted to a third remote communications link 720, located at yet a third distant place, for display on display 722, thereby providing valuable information concerning the process to interested parties located at neither the physical process site nor at the site where optional virtual signals are computed and the system monitoring is processed.

The remote communications links can be selected from a variety of techniques known in the art, including internet protocol based packet communication over the public telecommunications infrastructure, direct point-to-point leased-line communications, wireless or satellite. More specifically, remote links 708, 712 and 720 may be internet-enabled servers with application software for accumulating, queuing and transmitting data as messages, and queues for receiving and reconstituting data arriving as messages. Alternatively, communications can be synchronous (meaning in contrast to asynchronous, message-based communications) over a wireless link.

Figure 8:
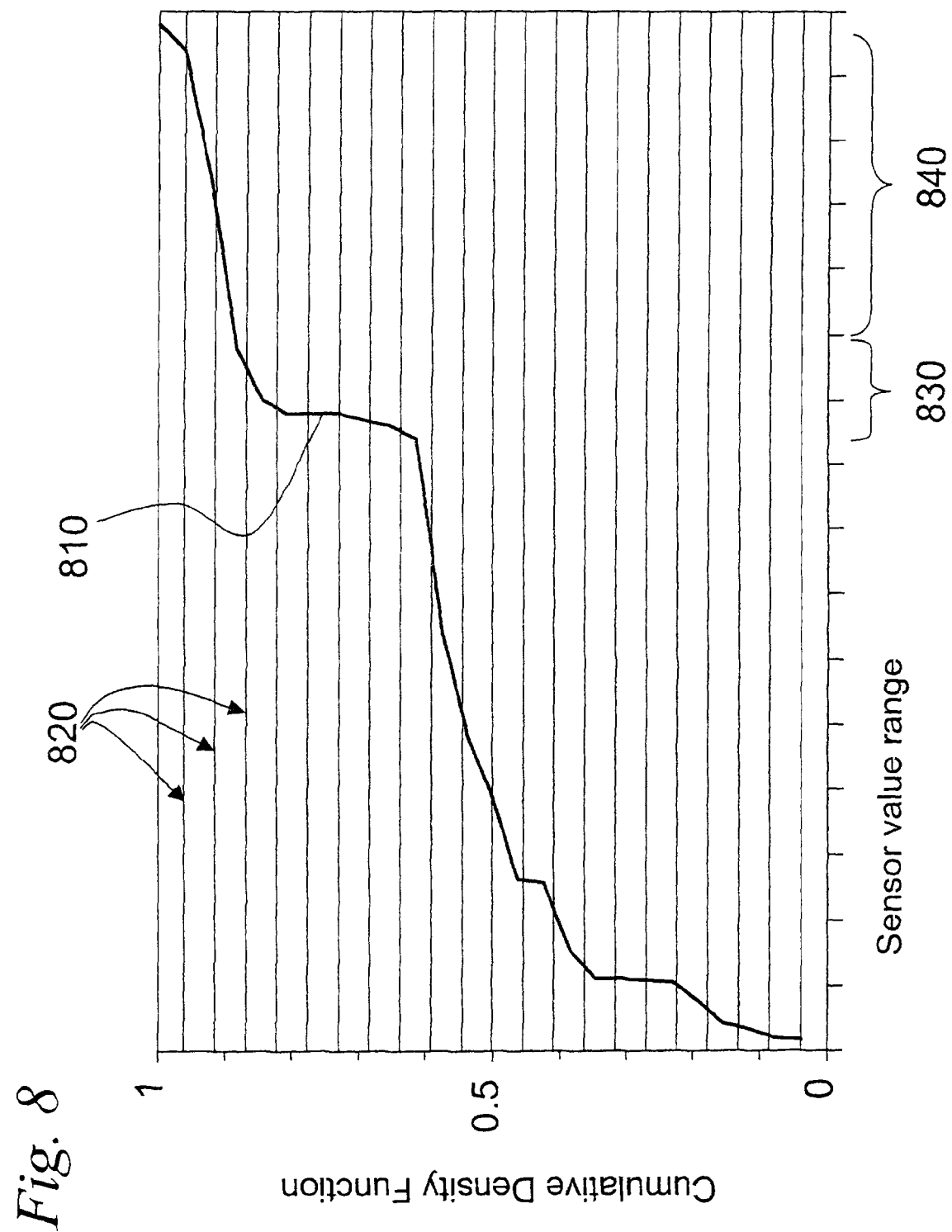
FIG. 8 shows a cumulative distribution function for the same data as in FIG. 5.

Another embodiment of the invention is shown in FIG. 8, wherein is shown the cumulative distribution function 810 for the same data as in FIG. 5. The cumulative distribution function provides a measure of probability that a randomly selected vector from the vector population that comprises the collected data will have a sensor value for the sensor in question that is less than or equal to the x-axis value. Consequently, the curve reaches 1, or 100%, at the extreme right and begins at zero at the extreme left of the x-axis. The x-axis is scaled to the range of data observed for the sensor over the collected data. A steep section of curve 810 indicates a large number of vectors that have a sensor value x around the steep section, while a flat region indicates a region of the x-axis sparsely populated in the collected data set. Lines 820 indicate equally spaced intervals that can be used to select vectors for inclusion in the training set. Wherever a line 820 intersects the curve 810, a vector must be chosen to add to the training set. Typically, for each such point, a subset of the collected snapshots will comprise those that make up the CDF, that is, are those that have a sensor value less than or equal to the value x along the x-axis. From that set, the vector having the highest value for that sensor is chosen.

The effect of this embodiment of the invention is to select more vectors from sub-ranges of the range observed for a sensor, where the data is heavily populated, such as at sub-range 830. Sub-ranges like 840 where data is sparse, are also sparsely represented in the final training set. This effect is overall opposite of the effect of that shown in FIG. 5, and is useful in the event that the model needs finer gradation of estimates for certain ranges where the data is densely populated.

Figure 9:
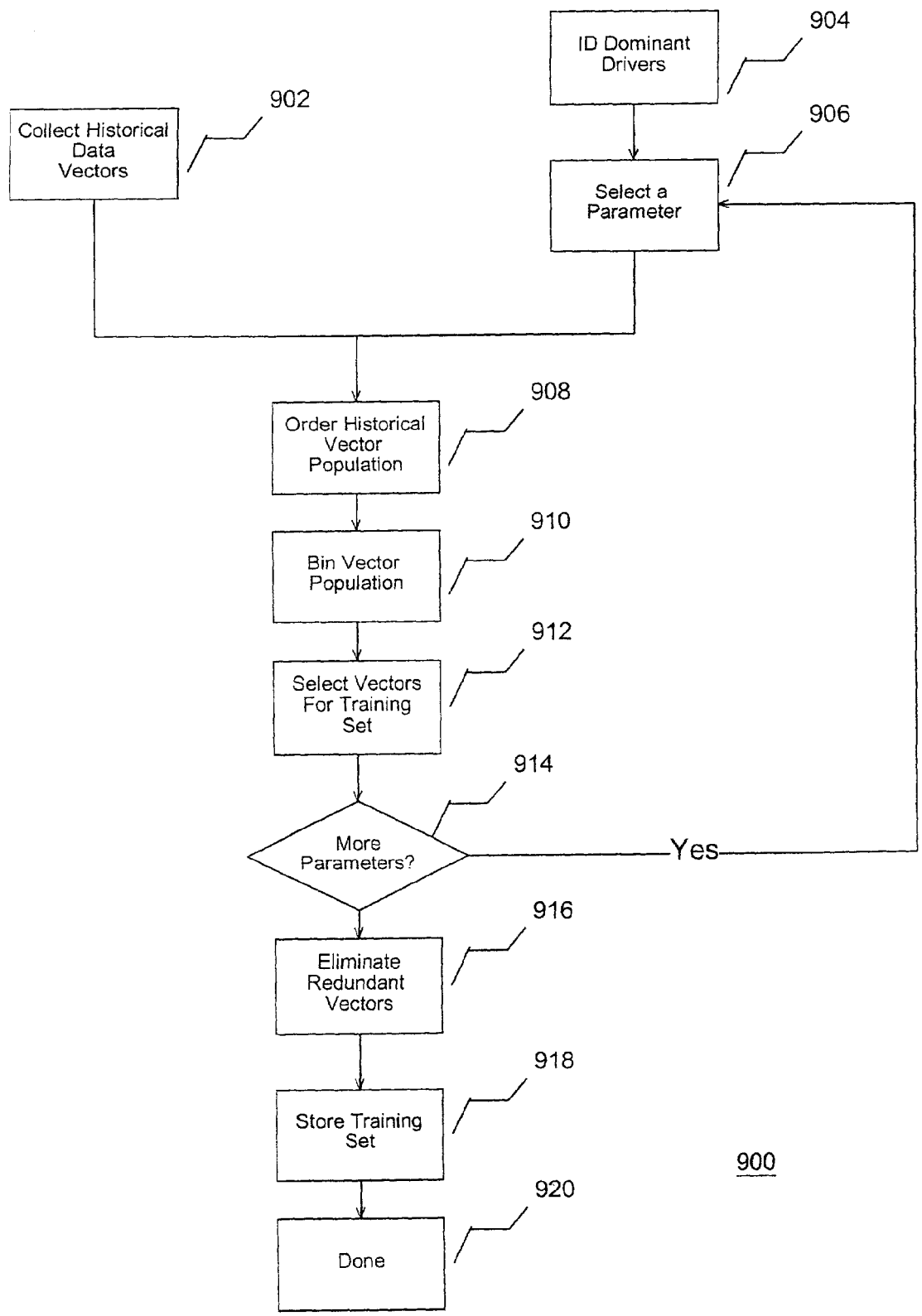
FIG. 9 shows a flow diagram for selecting a training set as in the example of FIG. 5.

FIG. 9 is a flow diagram 900 for the preferred embodiment of the present invention. Historical data is collected in step 902 as described hereinabove. Optionally, in step 904 dominant drivers may be identified. Then, in step 906 a parameter is selected from parameters included for collected sensor data. In step 908 historical data is ordered, sorting snapshots according to the selected parameter, e.g., in ascending order for that parameter. Next, in step 910 the vector space defined by the selected parameter is binned, i.e., bins are defined for the selected parameter. If additional snapshots are to be included only for dominant drivers, then for nondominant drivers the minimum and maximum of that particular parameter are provided as bin intervals in step 910. In step 912 vectors are selected for inclusion in the training set, for example selecting those vectors where the parameter value most closely approaches a bin value for inclusion in the training set. In step 914 a check is made to determine if any parameters remain unrepresented, i.e., have not had at least a min and max vector identified therefor. If any parameters remain, then returning to step 906 one of the remaining parameters is selected. Otherwise, vector selection is complete and in step 916 redundant vectors that may have been included are eliminated from the selected vectors. Next, in step 918 the selected vectors are stored as the training set. Finally, in step 920 training is complete.

Each selected vector is included in step 918 in its entirety in the training set regardless of other parameter values in that vector that might not approach any corresponding bin interval. Thus, if a vector is chosen in step 912 because of a particular parameter value being closest to a bin interval, the entire vector becomes part of the training set. With a sufficiently fine bin interval, the minima and maxima of all parameters are included in the final training set in step 918, just as would be achieved by applying the Min-Max method described above.

Numerous alternate tests may be substituted for use in selecting vectors in each bin in step 912 for inclusion in the training set. For example, those vectors wherein the parameter value that is closest to, but does not exceed, the bin value, or, conversely, vectors with parameter values that are closest to, but in no case less than the bin value may be included. In another example, the bin intervals may be chosen in a way that varies, as opposed to being constant, such as selecting a mathematical function that describes the bin intervals, e.g., a logarithmic function, or a geometric correspondence. Further, any of a wide variety of mathematical dependencies may be chosen for use in this invention as might readily be understood by those skilled in the art.

In yet another example, instead of using magnitudinal bin intervals to select training set vectors, a periodic or an aperiodic bin interval along the x-axis can be chosen, those vectors falling closest to the bin intervals being included in the training set. It should be noted that because the x-axis is an unitless enumerated axis indicating snapshot sequence number and with no or at best a very attenuated relationship to the vector, for purposes of ordering, the vectors may be ordered according to increasing or decreasing magnitude of the particular parameter value is analogous to selecting according to bin value, when selecting every nth vector in the same order, where n is some preselected number, especially for well behaved parameters.

It should be noted that although selection can be done graphically as described hereinabove, the present invention does not require that a chart be created and displayed; rather, FIGS. 5 and 8 are provided for example only as a way of describing visually what can be carried out computationally. By way of example, all the vectors in the historic available data can be maintained in a database and sorted according to parameter value. Then, bins may be calculated for the entire parameter range or for the entire parameter magnitude. Then, stepping through the database records in order, the parameter value for each vector is compared against a current bin value. When the closest parameter value is found, that vector is marked for inclusion in the training set. This is repeated until a vector is identified for each bin.

As indicated hereinabove, with reference to FIGS. 6A-B and 7, the present invention can be carried out on a computer with a memory and processor executing software to perform the necessary computations to generate the memory-stored file of resulting vectors in the final training set. The system can also include a training interface receiving real-time parameter data from sensors or from a distributed control system or the like. Therefore, the training set can be developed coincident with viewing a real-time signal feed from one or more sensors for a particular time period. Alternatively, the computer can sift through historic data stored in a file providing a training set data file therefrom.

In another embodiment, a microprocessor coupled with sufficient memory to store the historic data, either on-board or off-board, can be controlled to store the resulting training set locally for use with monitoring activities such as those described hereinabove.

It should be appreciated that a wide range of changes and modifications may be made to the embodiments of the invention as described herein. Thus, it is intended that the foregoing detailed description be regarded as illustrative rather than limiting and that the following claims, including all equivalents, are intended to define the scope of the invention.

What is claimed is:

1. A method of monitoring a system instrumented with sensors by selecting input vectors for extraction of representative data for training of an adaptive model, the input vectors being organized along an independent ('x') dimension to enable selection of vectors along a dependent ('y') dimension, the method comprising:
   receiving signals automatically as input to a computer and as a set of training vectors, said signals being derived from a plurality of the sensors and representing physical parameters of the monitored system;
   automatically ordering the set of training vectors according to a corresponding value in each vector of a particular sensor and assigning each training vector a sequence number according to the ordering to form the 'x' dimension of the data with the sequence numbers;
   automatically dividing the set of training vectors according to equally spaced ranges selected across the magnitude of the data, the magnitude forming the 'y' dimension of the data;
   automatically selecting at least one vector from each of the equally spaced ranges while selecting less than all of the training vectors of the equally spaced ranges for training the adaptive model; and
   automatically training the adaptive model with only the vectors selected in the selecting step and with training calculations that use sensor reading values from the signals that form the vectors.

2. A method according to claim 1, further comprising the step of including for training the adaptive model each vector that contains a maximum or a minimum value for any given sensor across the set of training vectors.

3. A method according to claim 1, further comprising carrying out the ordering, dividing and selecting steps for each sensor represented in the set of training vectors.

4. A method according to claim 1, wherein said ordering step comprises ordering the set of training vectors according to the magnitude of the particular sensor.

5. A method according to claim 4, wherein a vector is selected from one of the equally spaced ranges through the ordering by magnitude such that the selected vector is the vector with a sensor value highest within the range.

6. A method according to claim 1, wherein said ordering step comprises ordering the set of training vectors so as to provide a cumulative density function for the particular sensor.

7. A method according to claim 6, wherein a vector is selected from one of the equally spaced ranges through the cumulative density function such that the selected vector is the vector with a sensor value highest within the range.

8. An apparatus for training an adaptive model for monitoring a system instrumented with sensors, comprising:

data acquisition means for automatically acquiring signals from sensors representative of operational states of the monitored system;
an empirical modeling module responsive to the data acquisition means for automatically providing indications about the operational states of the monitored system;
a data store for automatically storing modeling parameters for use by the empirical modeling module; and
a training module to automatically distill characteristic operational sensor data acquired from the monitored system to a representative set of sensor data for storing in the data store and to train an empirical model of said empirical modeling module, by selecting, from the characteristic operational sensor data, time-correlated observations representative of regularly spaced intervals, wherein the number of observations selected is less than the total number of observations within the intervals, and selected across the magnitude of the data and forming a 'y' dimension of the data, and selected along an ordering of the observations according to values in the observations of a particular sensor, wherein each observation is assigned a sequence number according to the ordering, the sequence numbers forming the 'x' dimension of the data.

9. An apparatus according to claim 8, wherein the training module includes in the representative set of sensor data observations having a maximum or a minimum value for a particular sensor across all the characteristic operational sensor data.

10. An apparatus according to claim 8, wherein selection of observations representative of regularly spaced intervals is performed for an ordering for each sensor in the system.

11. An apparatus according to claim 8, wherein said ordering is according to the magnitude of the particular sensor.

12. An apparatus according to claim 8, wherein said ordering is according to the cumulative density function for the particular sensor.

13. The apparatus according to claim 8 wherein the training module uses sensor reading values obtained from the observations in calculations.

14. A method of monitoring a system instrumented with sensors by selecting a set of training vectors representative of a system, said training set forming an empirical model of said system, said method comprising the steps of:
a) automatically collecting historical data by using a computer and a memory, said historical data including a plurality of system vectors each indicating an operating state of said system, each of said vectors containing elements derived from values of a plurality of sensors representing physical system parameters of said system;
b) automatically selecting one of said system parameters of said system;
c) automatically ordering said plurality of system vectors according to a value of each said vector related to said selected system parameter, assigning a sequence number to each said ordered vector according to the ordering, and using the sequence numbers to represent an 'x' dimension of data;
d) automatically binning said plurality of vectors according to said ordering of said selected parameter by forming bins selected across the magnitude of the data, wherein the magnitude forms a 'y' dimension of the data;
e) automatically selecting a vector from each bin;
f) only selected said vectors forming a training set while including less than all ordered vectors in the training set, and said training set forming said empirical model for monitoring system operation including training with calculations that use sensor reading values from said historical data and used to form said selected vectors.

15. A method as in claim 14 wherein the step b) of selecting a system parameter comprises identifying dominant driver parameters.

16. A method according to claim 15 wherein the step b) of selecting system parameters further comprises selecting a bin number, said bin number being used in binning step d) said bin number determining the number of bins in which the plurality of vectors is divided.

17. A method as in claim 16 wherein the bin number provided for dominant driver parameters is greater than the bin number used for all other parameters.

18. A method as in claim 16 wherein said system vectors are ordered in step b) in ascending magnitude order for said selected parameter.

19. A method as in claim 16 wherein said system vectors are ordered in step b) in descending magnitude order for said system selected parameter.

20. A method as in claim 16 wherein in the step e) of selecting a vector from each bin, one of the plurality of system vectors is identified as having a value for said selected parameter closest to a bin magnitude of each bin, identified ones being selected for initial inclusion in said training set.

21. A method as in claim 16 wherein in the step e) of selecting a vector from each bin, one of the plurality of system vectors is identified as having a value for said selected parameter closest to but not exceeding a bin magnitude of each bin, identified ones being selected for initial inclusion in said training set.

22. A method as in claim 16 wherein in the step e) of selecting a vector from each bin, one of the plurality of system vectors is identified as having a value for said selected parameter closest to but not less than a bin magnitude of each bin, identified ones being selected for initial inclusion in said training set.

23. A method as in claim 16, after the step e) of selecting vectors from each bin further comprising the steps of:
g) checking system parameters to determine if other parameters remain unselected; if other parameters are determined to remain unselected,
h) selecting an unselected parameter, said unselected parameter being identified as the selected parameter;
i) returning to step c) and repeating steps c) through h) until all system parameters have been selected; otherwise,
j) eliminating redundant selected vectors; and
k) storing said selected vectors as a training set for modeling and monitoring system operation.

24. A system for automatically monitoring activity of another system, said system comprising:
a control unit controlling a monitored system;
a data acquisition unit receiving information from said control unit and from said monitored system and providing system snapshots therefrom, system snapshots representing the state of said monitored system relative to the time the snapshot is taken, each snapshot having values for a plurality of parameters associated with the monitored system and being a vector;
a memory storing said system snapshots;
a sorter sorting collected system snapshots responsive to a selected system parameter and sorting the system snapshots into an order based on the value of each snapshot corresponding to the selected parameter, assigning each system snapshot a sequence number according to the order, and using the sequence numbers to form an 'x' dimension of data;

a plurality of bins selected across the magnitude of data and forming a 'y' dimension of the data; and a vector selector binning sorted snapshots as the vectors and selecting a vector from each bin and, only said selected vector being a system snapshot provided to include in a training set so that said training set includes less than all of said vectors included within the bins.

25. A system as in claim 24 further comprising:

means for eliminating redundant collected vectors, remaining said vectors forming said training set; and a memory storing said, training set.

26. A system as in claim 25, wherein the vector selector divides the range of said selected system parameter into a plurality of evenly spaced bins and selects a sorted snapshot from each bin as the selected vector, each said selected vector being identified as having a parameter value closest to a corresponding bin value.

27. A system as in claim 24 wherein the vector selector divides the range of said selected system parameter into bins having equal number of system snapshots.

28. The system as in claim 24 further comprising a training module that uses sensor reading values from the selected vectors in calculations.

29. A computer program product for selecting input vectors for extraction of representative data for training of an adaptive model, said computer program product comprising a computer readable medium having executable instructions thereon which when executed cause a processor to execute:

a step for receiving signals as input from a plurality of sensors as a set of training vectors;

a step for automatically ordering the set of training vectors according to a corresponding value in each vector of a particular sensor, assigning a sequence number to each ordered vector according to the ordering, and using the sequence numbers to form an 'x' dimension of data;

a step for automatically dividing the set of training vectors according to equally spaced ranges selected across the magnitude of the data and forming a 'y' dimension of the data; and a step for automatically selecting at least one vector, but less than all vectors, from each of the equally spaced ranges, to train the adaptive model.

30. A computer program product for selecting input vectors according to claim 29, further comprising computer readable program code on said computer readable medium which cause a processor to execute a process for selecting for inclusion in training the adaptive model each vector that contains a maximum or a minimum value for any given sensor across the set of training vectors.

31. A computer program product for selecting input vectors according to claim 30, further comprising computer readable program code means for iteratively executing across all sensors in said training vectors, said ordering, dividing and selecting steps.

32. A computer program product for selecting input vectors according to claim 31, further comprising computer readable program code means for eliminating redundant selected vectors.

33. A computer program product for selecting input vectors according to claim 29, wherein the step for automatically ordering orders the set of training vectors according to the magnitude of the particular sensor.

34. A computer program product for selecting input vectors according to claim 33, wherein a vector is selected from one of the equally spaced ranges through the ordering by magnitude such that the selected vector is the vector with a sensor value highest within the range.

35. A computer program product for selecting input vectors according to claim 29, wherein the step for automatically ordering orders the set of training vectors so as to provide a cumulative density function for the particular sensor.

36. A computer program product for selecting input vectors according to claim 35, wherein a vector is selected from one of the equally spaced ranges through the cumulative density function such that the selected vector is the vector with a sensor value highest within the range.

37. The computer program product according to claim 29 further comprising a training process that uses sensor reading values from the selected vectors in calculations to train the adaptive model.

* * * * *